United States Patent [19]

Johnson et al.

[11] Patent Number: 5,398,315
[45] Date of Patent: Mar. 14, 1995

[54] MULTI-PROCESSOR VIDEO DISPLAY APPARATUS

[75] Inventors: Brian C. Johnson, Stamford, Conn.; Michael A. Epstein, Spring Valley, N.Y.

[73] Assignee: North American Philips Corporation, New York, N.Y.

[21] Appl. No.: 998,358

[22] Filed: Dec. 30, 1992

[51] Int. Cl.⁶ .............................................. G06F 3/14
[52] U.S. Cl. .................................................. 395/163
[58] Field of Search ............... 395/101, 162, 163, 164; 358/310, 903

[56] References Cited

U.S. PATENT DOCUMENTS

| | | | |
|---|---|---|---|
| 4,631,690 | 12/1986 | Corthout et al. | 395/120 |
| 4,979,096 | 12/1990 | Ueda et al. | 395/325 |
| 5,262,965 | 11/1993 | Putnam et al. | 395/101 |

FOREIGN PATENT DOCUMENTS

| | | |
|---|---|---|
| 0367445 | 3/1990 | European Pat. Off. . |
| 0367182 | 5/1990 | European Pat. Off. . |
| 0367183 | 5/1990 | European Pat. Off. . |

OTHER PUBLICATIONS

D. Chin et al., The Princeton Engine; A Real-Time Video System Simulator, IEEE Trans. C.E., vol. 34, No. 2, 1988, pp. 285-297.

*Primary Examiner*—Mark R. Powell
*Assistant Examiner*—U. Chauhan
*Attorney, Agent, or Firm*—Leroy Eason

[57] ABSTRACT

Video display apparatus having multiple processors for operation in parallel, each processing a respective complete video image in the sequence of video images (fields or frames) which form a video picture, the processing being in accordance with a selected signal processing algorithm. The algorithm may be one which simulates a signal processing circuit design which is to be evaluated, so that the effect of changes in circuit design can be displayed in real time. The signal data for each of the sequential video images is assembled into data packets in successive equal time slots, which are transmitted downstream on a data bus along which are a succession of data processors. The headers of the packets for a given image identify a serially corresponding processor to which such image is assigned, and such packets are processed by the assigned processor in accordance with the selected algorithm. If the processing time of each processor corresponds to the time period of N images, then by using N processors the nth processor will have completed processing of the nth complete image by the time of arrival of the (N+n) th image. Each series of N images can therefor be cyclically assigned to the series of processors, and are processed in parallel in real-time. Provision is made for inter-processor communication when the algorithm has temporal effects on the video picture which necessitate FIR or IIR filtering in order to display such effects.

6 Claims, 4 Drawing Sheets

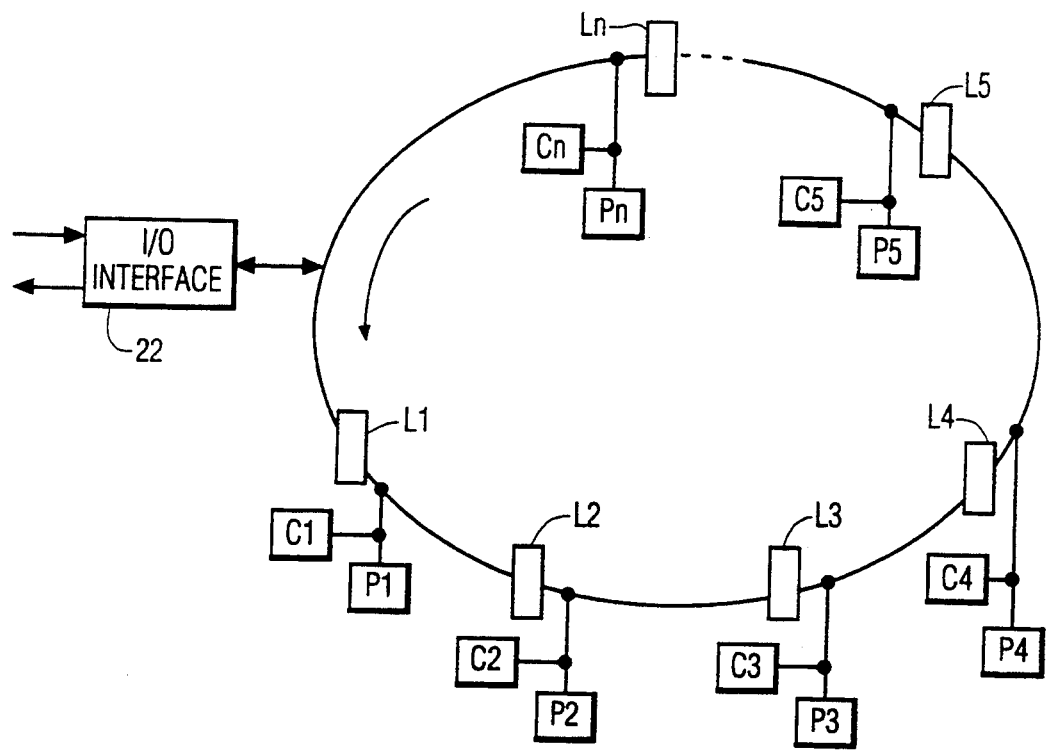
FIG. 5
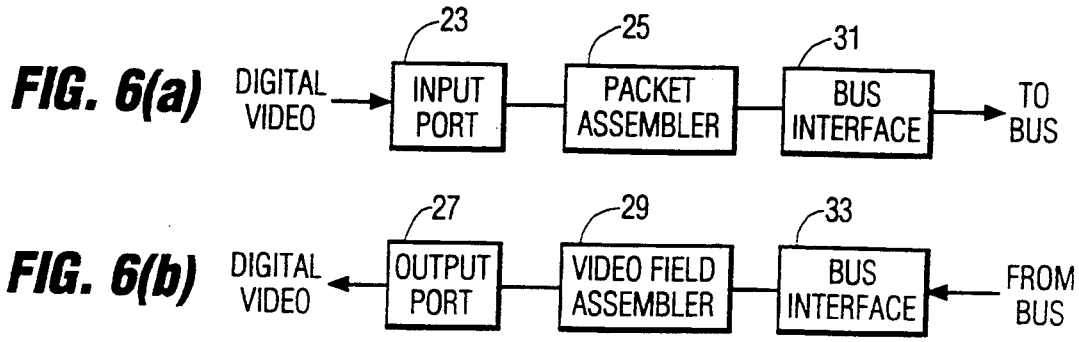

MULTI-PROCESSOR VIDEO DISPLAY APPARATUS

BACKGROUND OF THE INVENTION

1. Field of the Invention

The present invention relates to video display apparatus, and more particularly to such apparatus comprising a series of data processors concurrently operating in parallel to provide real time display of a video picture in accordance with a selected signal processing algorithm; for example, a signal processing algorithm which is to be evaluated.

2. Description of the Related Art

Product life cycles of video display apparatus are continually falling with the rapid advent of new and improved features of video signal processing circuits, and the resulting additional complexity of such circuits increases the development time, cost and risk to the supplier. In order to minimize this, computer-aided simulation is employed to simulate the effect on a video picture of various possible signal processing algorithms which are to be evaluated. The video signal corresponding to the series of raster images (fields or frames) which form the picture is processed by a computer programmed to execute an algorithm which is functionally equivalent to the combination of signal processing circuits employed in the actual video display apparatus, and the so-processed signal is supplied to a video display terminal on which the video picture corresponding thereto is formed. The computer program can then be altered, thereby altering the picture, until a satisfactory result is achieved. The final program can then readily be translated into a picture, until a satisfactory result is achieved. The final program can then readily be translated into a system block diagram of standard signal processing blocks, which in turn can be converted into logic code for fabrication of an integrated circuit which will provide signal processing corresponding to the algorithm carried out by the computer program.

The prior art teaches to achieve such simulation on the basis of one or only a few of the time-sequential images which form the video picture, but this does not take into account temporal effects which may result from the processing algorithm. For simulation of both spatial and temporal effects it is necessary to operate in real time, using all of the successive video images. However, real time simulation of the effect of sophisticated processing algorithms on complex video signals, such as those in accordance with NTSC or proposed HDTV standards, would necessitate super-computer performance. This problem has been approached by employing a multiprocessor architecture, using a sufficient number of processors operating in parallel so as to achieve a very high processing rate.

A known type of such a real time multiprocessor video simulator architecture is the "Princeton Engine" developed by the David Sarnoff Research Center in Princeton, N.J., which employs up to 2,048 high speed microprocessors operating in parallel (see "The Princeton Engine: A Real-Time Video Simulator", D. Chin et al, IEEE Trans. Computer Electronics, Vol. 34, No. 2, May 1988, p. 285–297). Each processor stage is assigned to a different area of a particular field of the video picture, thereby reducing the amount of data which must be processed by each individual processor. However, since the effect produced in a given area of the image may be influenced by the effect of the processing algorithm in one or more other areas of the image field, such a parallel architecture requires complex programming and many interstage communication channels even though only a few of such channels may actually be required for a particular image field. The system is therefore relatively inefficient.

SUMMARY OF THE INVENTION

The parallel computer architecture of video signal processing apparatus in accordance with the invention is based on applicant's realization that in dealing with the generation, processing and manipulation of sequential video images, e.g., successive fields or frames of a video picture, each respective entire image should be processed by a respective processor. With a number N of processors it is then possible to concurrently process N complete images, and during processing of its assigned image each processor has access to all of the spatial and temporal data of that image. The need for interprocessor communication channels is thereby greatly reduced.

This can be understood by reference to FIG. 1, showing assignment to a series of processors of respective ones of a series of video images, for example the video fields of a real-time video data signal provided by an image sensor such as a TV camera, radar or video tape or disc playback apparatus. If the required processing time of each processor corresponds to the time interval of N successive images, real-time processing can be achieved by cyclically assigning each successive series of N input image fields to N successive processors. Thus, input field 1 is assigned to processor 1, which commences processing. While that is in process input field 2 is received which is assigned to processor 2 and it also commences processing. By the time N successive fields have been received, processor 1 will have completed processing of image field 1 and outputted the result and so is available to receive and commence processing of field (N+1). By the time input field (N+2) is received processor 2 will have completed processing of field 2 and outputted the result, and so is available to receive and commence processing of such field (N+2). Using, for example, Intel 80860 microprocessors, which run at 40 Mhz and can read/write 8 bytes at up to 20 MHz, a series of 128 identical processors (each including an associated memory and bus controller) can provide real time processing of video signals in accordance with existing NTSC standards as well as those proposed for HDTV. The requisite number of processors will depend on the complexity of the algorithm to be evaluated and the dimensions of the video picture to be produced, since these affect the requisite time to complete processing of each respective image field of the picture.

If only spatial data is to be processed, as in graphics which do not involve temporal data, that reduces the requisite number of processor stages. This is because, since each processor handles an entire image, a reduction in the number of stages only reduces the speed of computation for all of the images of the video picture but does not affect the picture size. This is in contrast with existing parallel processors, which use the Single Instruction Multiple Data (SIMD) mode of operation according to which each stage is assigned to a local area of a given video image, whether or not video data must be processed for that area. In addition, with the SIMD architecture, as typified by the Princeton Engine, the size of the video picture is limited by the number of processor stages. A video display apparatus in accordance with the invention provides real-time display of the video picture resulting from video signal processing in accordance with a selected processing algorithm, as applied to a digital video signal representing a series of images which constitute the video picture. The apparatus comprises an input interface, which is a logic circuit for receiving the digital video signal and assembling the data therein into successive data packets, each packet including a header identifying the video image to which a given packet relates. The input interface supplies the data packets to a data bus along which are a series of tristate bus latches which operationally segment the bus into successive segments, transmission to a succeeding segment being controlled by the associated bus latch. Each bus latch may consist of a register for storing a received data packet and a tristate buffer which controls the transmission of such data packet on the relevant bus segment. A series of programmable bus interconnection controllers are respectively coupled to the respective bus segments, each of which controls the bus latch for the corresponding bus segment and determines from the headers of data packets arriving at such latch to which of the sequential video images the arriving packets relate. The controllers are programmed so that each serial one thereof selects the packets for a corresponding serial one of the successive video images in each successive group of a predetermined number of such images, and permits other packets to proceed downstream to the bus latch of the next bus segment. A series of data processors are respectively coupled to the respective bus segments and associated controllers, each for receiving from its bus segment all of the data packets relating to a respective video image selected by the relevant controller. Each data processor is programmed to process the data packets of the selected image in accordance with the applicable signal processing algorithm and to supply the processed packets back to the bus segment for transmission on the bus, such transmission being synchronized by the relevant controller. The number N of data processors is such that processing of all data packets relating to each video image is completed by the processor assigned to that image within the time period of N video images, so that each successive series of N video images can be cyclically assigned by the successive controllers to the series of data processors. Thus, the data processors respectively process in parallel the data packets of respective entire video images of the video picture. An output interface, which is a logic circuit similar to the input interface, receives the processed data packets at the output of the bus and assembles them back into the format of a digital video signal for a video display terminal. The display terminal thereby produces a video picture in accordance with the selected signal processing algorithm.

IN THE DRAWINGS

The invention will now be described in more detail with reference to the accompanying drawings, wherein:

FIG. 5 is a ring bus configuration of the video display apparatus in FIG. 3; and FIGS. 6a and 6b block diagrams of the input and output interfaces in FIG. 4 and the corresponding composite interface in FIG. 5.

DESCRIPTION OF THE PREFERRED EMBODIMENTS

Figure 1:
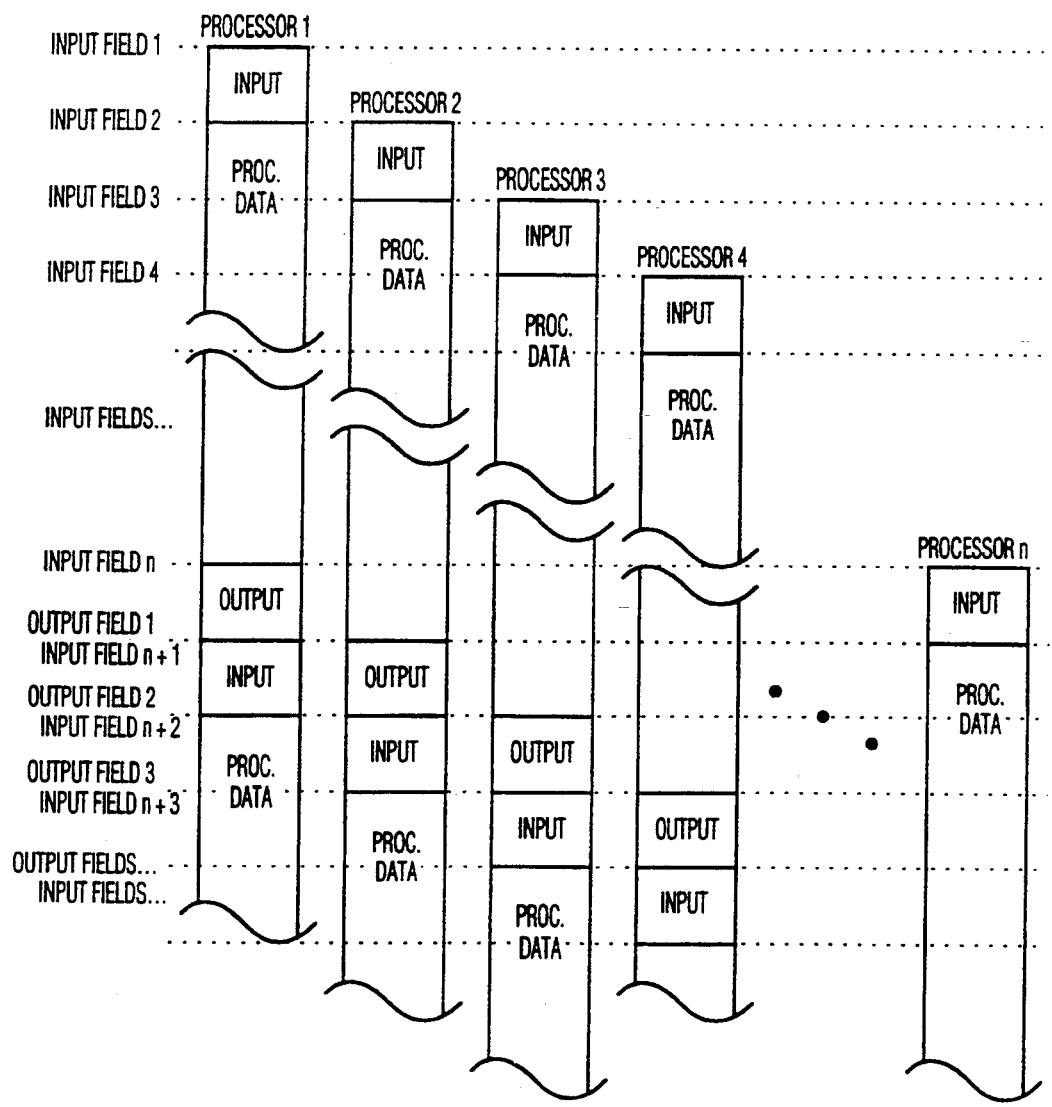
FIG. 1 is a diagram showing how the successive video images, such as fields, of a video picture are assigned to successive data processors operating concurrently.
Figure 2:
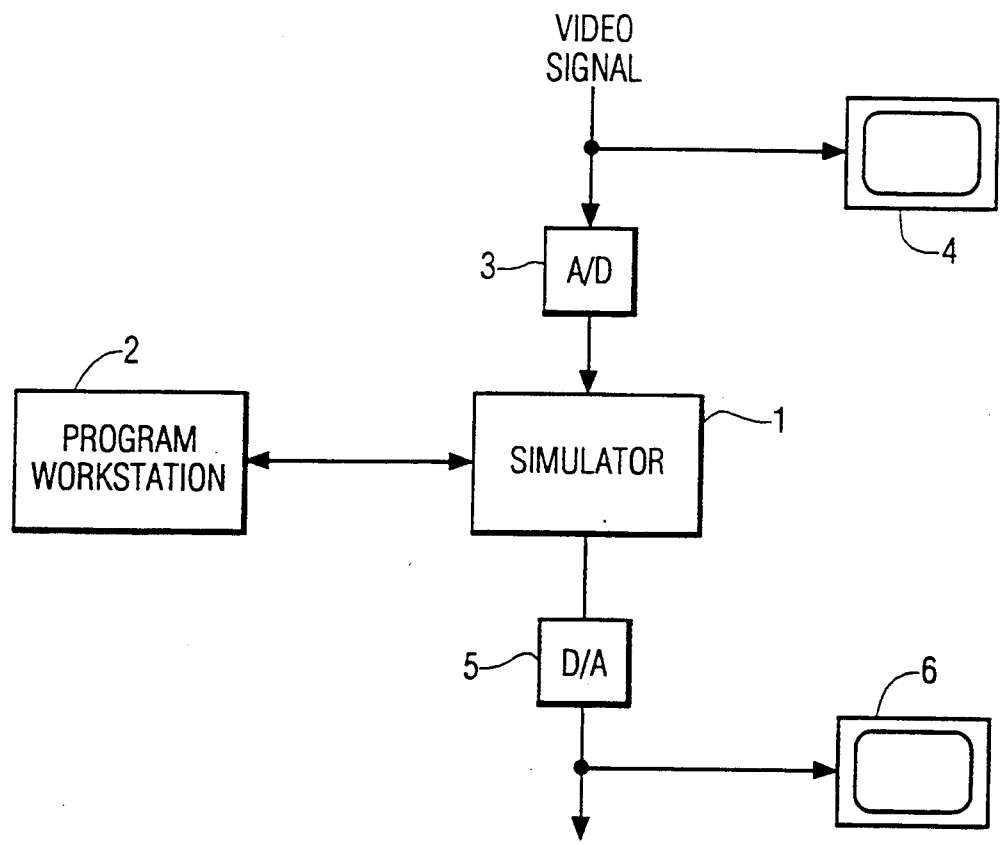
FIG. 2 is a block diagram of a system employing video display apparatus in accordance with the invention as a simulator in order to determine the design of signal processing circuits which will have a desired effect on a video picture.

FIG. 1, which illustrates the fundamental concept of the invention, has already been described above. FIG. 2 shows in block form how video display apparatus in accordance with the invention may be employed as a simulator 1 for signal processing circuit design. A workstation 2 generates and compiles to object code, a program corresponding to a video signal processing algorithm to be evaluated, and programs the simulator 1 in accordance therewith. This includes such programming of each of the parallel processors included in simulator 1. The workstation 2 is itself a processor which is programmed with software such as for example Signal Processing Workbench (SPW) available from Comdisco Systems, which creates signal processing algorithms according to logic block diagrams of circuit modules in a standard library of ASIC modules. Modifications of a processing algorithm can thereby be directly translated into a corresponding block diagram of ASIC modules which provide signal processing in accordance with the modified algorithm.

The simulator 1 receives a digital video signal, for example an analog NTSC or HDTV color signal which has been digitized by way of an A/D converter 3. The video picture corresponding to the original signal is concurrently displayed on a video monitor 4. After processing by simulator 1 in accordance with the algorithm to be evaluated, the resulting processed digital signal is converted by D/A converter 5 back into analog form and supplied to a further video monitor 6 on which the simulated processed picture is displayed. The processed analog signal is also available as an output from D/A converter 5 for use in other video apparatus.

Figure 3:
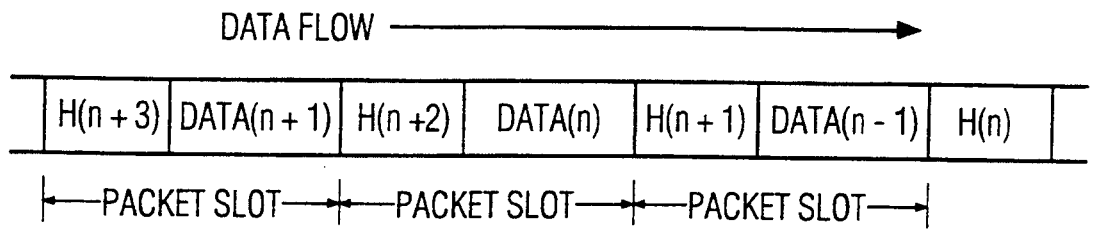
FIG. 3 shows the structure of the data packets, including headers, which are transmitted downstream in successive time slots on the data bus of the video simulator in FIG. 4.
Figure 4:
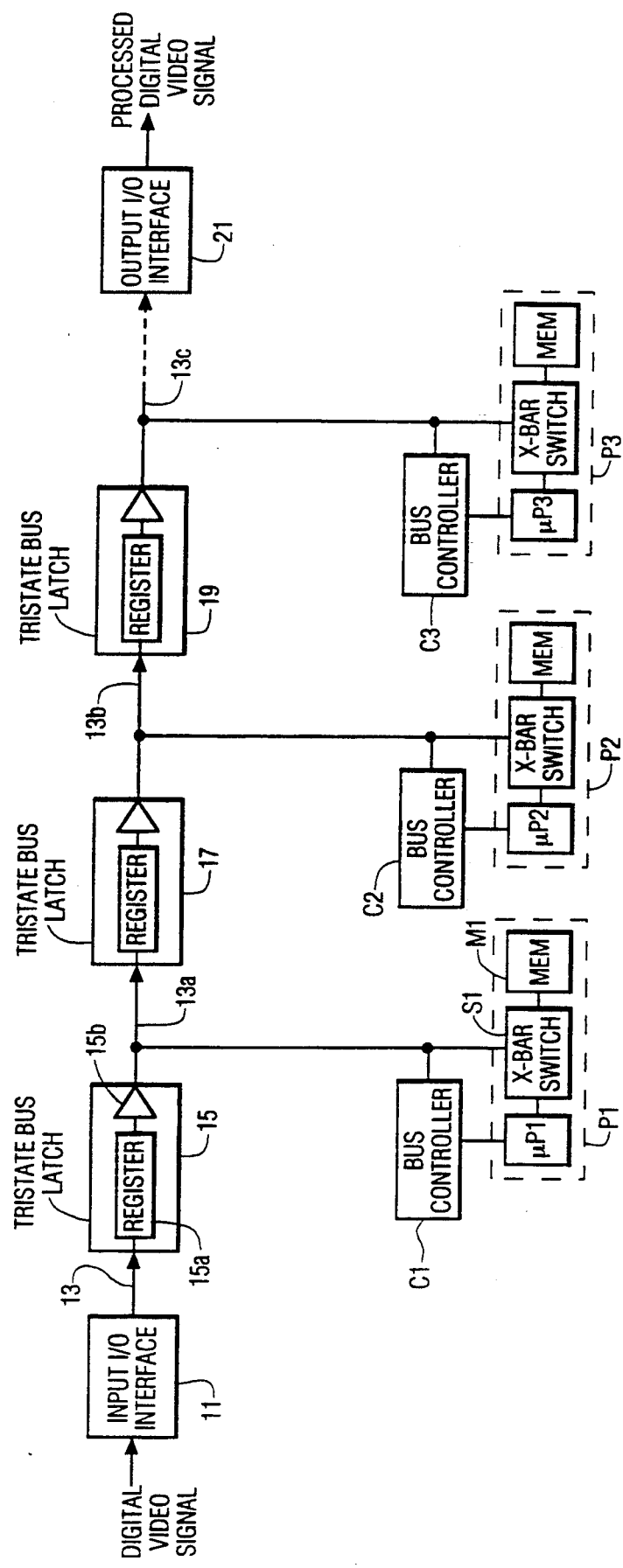
FIG. 4 is a block diagram of video display apparatus in accordance with the invention.

Referring now to the video display apparatus shown in the block diagram in FIG. 4, a digital video input signal corresponding to the successive image fields of a video picture is received by I/O input interface 11. This is a logic circuit, described in more detail below with reference to FIG. 6a, which assembles the signal data into data packets for synchronous transmission downstream in successive equal time slots on a data bus 13. A time slot in which there is no data in the video signal will bean empty data packet, the packets being conceptually analogous to successive flat cars on a railroad track and which may be each be empty or full. The input interface 11 also provides a header in each packet, containing data identifying the video image field to which a particular packet relates and whether the data relevant to such image or the modified image derived therefrom is necessary for processing of the data relevant to a subsequent image, as explained hereinafter. The header relevant to a given packet is preferably transmitted in a prior packet, as shown in FIG. 3.

Therein the time slot assigned to data packet n has a leading portion Data (n) containing the video data of such packet, followed by a header portion containing the header H(n+2) for the data packet (n+2) which is two time slots later than that of packet n. Thus, the header H(n) for data packet n will be received by the processor which is to process such packet one time slot prior to actual arrival of such packet, thereby permitting the relevant processor time to prepare to commence processing of packet n as soon as it arrives.

Along data bus 13 are a succession of bus interconnection tristate latches, only three of which, 15, 17 and 19 are shown, each being a circuit comprising a register and a tristate buffer such as register 15a and tristate buffer 15b in latch 15, each tristate buffer being controllable to either a transmissive state in which received data packets are passed to the following bus segment or to the associated processor, or a high impedance "open" state in which data packets received from the associated data processor are supplied to the bus. Such tristate buffers are well known, being described for example in the text "Microcomputer/Microprocessor" by J. L. Hilburn et al, 1976, Prentice Hall, Inc., pp 41–42. The latches serve to operationally segment the bus 13 into successive segments 13a, 13b, 13c, etc., transmission to a neighboring downstream bus segment only occurring when the associated latch is actuated. The register in each latch temporarily stores a received data packet, and when the associated tristate buffer is actuated it causes read-out of the stored packet for transmission to the neighboring downstream bus segment. This enables interprocessor exchange of data, which is necessary when the algorithm to be executed creates temporal effects which must be displayed.

Bus segment 13a following the first tristate latch 15 is coupled to a first data processor P1, the next bus segment 13b following the second tristate latch 17 is coupled to a second data processor P2, the next bus segment 13c following the third tristate latch 19 is coupled to a third data processor P3, etc. The data processors (hereinafter sometimes referred to as video processors) are identical, each including a microprocessor unit such as the Intel 80860 mentioned above. Considering video processor P1, it also includes, coupled to its microprocessor unit $\mu$p1, a crossbar switch S1 which receives and supplies data packets to bus segment 13a and which is further coupled to a memory unit M1. Microprocessor $\mu$p1 is also coupled to a bus controller C1 which is itself connected to switch S1 and bus segment 13a. The remaining video processors each also include a crossbar switch and memory unit as in data processor P1, bus access being controlled by their respective associated bus controllers C2 and C3. Each bus controller is a processor dedicated to control of bus access by the associated video processor, and from the headers of data packets arriving at the associated bus latch determines which of such packets relate to a particular video field. The bus controllers are programmed so that successive ones thereof select the packets relevant to successive ones of the sequential video fields, and control the associated bus latches to permit other packets to proceed downstream on the bus unaltered. The video data in packets relating to the selected video field is transmitted from the bus latch to the associated video processor, the headers for such packets are modified to indicate that they are now empty, and the empty packets are transmitted downstream on the bus.

Upon completion of processing a data packet of a given video field, which in the case of the first video processor P1 will be the first in a particular group of N successive fields, the processed packet is stored in memory M1 via cross-bar switch S1. When all packets of such field have been processed, the microprocessor $\mu$p1 commands the bus controller C1 to transmit the stored processed data packets from memory M1 to bus segment 13a for transmission downstream on the bus 13 in empty time slots as such time slots (empty data packets) are received. The bus controller C1 maintains a queue of requests to transmit stored data packets, each request giving the addresses in memory M1 of the stored packets. When an empty packet time slot becomes available the controller C1 actuates switch S1 to send the relevant stored packet and remove the transmit request for such packet from the queue. Although the bus controllers have been described as processors auxiliary to the associated video processors, it will be obvious that each video processor can be a data processor which includes the relevant bus controller in the form of hardware or software.

In the case of algorithms which only affect picture parameters in the spatial domain, i.e. variations in definition, color, contrast, etc., processing is straightforward since each video processor has all of the data of an entire image field available to it. There is then no need to be provided with data relating to other image fields, and so inter-processor communication is unnecessary. In the event that a particular algorithm requires more processing time this can be achieved simply by including more video processors on the data bus, as explained above with reference to FIG. 1. Processing in the time domain, however, necessitates interprocessor communication. A typical example of this arises in the case of an algorithm which requires each processor to perform a three-tap FIR calculation, necessitating that each be supplied not only with data for its assigned image but also with the data relevant to the two preceding images assigned to the two nearest upstream processors. To achieve this, a processor $P_n$ controls its bus controller $C_n$ so as to supply to the neighboring downstream processor $P_{n+1}$ a copy of the data which was received by processor $P_n$ for processing of its assigned image and also a copy of the data which was received by processor $P_n$ from its neighboring upstream neighbor $P_{n-1}$. If a three-tap IIR calculation is to be performed, then each processor will require the processed data produced by its two neighboring upstream processors. In that case a processor $P_n$ supplies to its neighboring downstream processor $P_{n+1}$ a copy of the processed data produced by processor $P_n$ and also a copy of the processed data produced by its neighboring upstream processor $P_{n-1}$ and sent downstream by that processor to processor $P_n$.

To provide for such interprocessor transfers, packets to be sent by a processor $P_n$ to its downstream neighbor are stored by processor $P_n$ in a first distinct section of the memory $M_n$ of processor $P_n$ (called an "output FIFO"), and packets received by the processor $P_n$ from its own upstream neighbor are stored in a second distinct section of the memory $M_n$ of processor $P_n$ (called an "input FIFO"). Such packets are specifically identified as FIFO packets. If data is needed from a processor several stages away, it is sent through the intervening processors one packet at a time through the FIFO memory sections of such processors.

The processed data packets produced by all processors are transmitted downstream on the data bus and after traversal of all segments thereof are finally received at an output I/O interface 21. This is a logic circuit substantially the same as input I/O interface 11, but arranged to assemble the processed data packets back into the format of a composite digital video output signal which, after D/A conversion, is supplied to the input terminals of a video display terminal.

Since the last processor on the data bus processes the last image field of a given sequence, which field precedes the first image field of the next sequence to be serially assigned to the successive processors, there may be situations which necessitate that the last processor $P_n$ be able to communicate with the first processor $P_1$. This will occur, as described above, when temporal processing is to be performed on the video signal. It is therefore preferable to arrange the data bus in the form of a ring, as shown in FIG. 5. Therein the successive tristate bus latches have been designated as $L_1$, $L_2$, $L_3$, $L_4$, . . . $L_n$. The downstream direction on the bus is counter clockwise, and data packets synchronously circulate thereon from segment to segment. In this arrangement only a single I/O interface 22 is necessary, and serves not only to assemble the data of the input digital signal into data packets which are supplied to the bus but also to receive the processed data packets from the last tristate latch $L_n$ and assemble them back into the format of a digital signal for actuating a video display terminal to produce the processed video picture. The interface 22 is therefore equivalent to a combination of interfaces 11 and 21 in FIG. 4.

Ring networks for data packet transmission as shown in FIG. 3 are well known in the art, being described for example in the text "Computer Networks" by A. S. Tanebaum, 2d ed., 19888, Prentice Hall, p. 153–163.

FIG. 6a is a block diagram of input I/O interface 11 in FIG. 3, and FIG. 6b is a block diagram of output I/O interface 21 therein. In the ring bus arrangement of FIG. 5 both would be included together as a single composite circuit 22. The input port 23 is a circuit which extracts image field synchronizing information from the input video signal and supplies it to the data packet assembler logic stage 25. The output port 27 inserts image field synchronizing information into the processed digital video signal produced by video field assembler logic stage 29. The data packet assembler 25 is a data shifter which converts the video data into packets of a size which can be stored in the processor memories, and includes logic circuitry to include the appropriate identifying headers in the data packets. For example, if the video input data words are one byte wide, the size of each data packet may be 8 bytes representing 8 separate video parameters. The video field assembler 29 is a data shifter which assembles the processed data packets into data words corresponding to each successive field of the video signal for the monitor used to produce the simulated video picture, each such field being identified by the packet headers. The bus interface 31 coupled to packet assembler 25 includes a buffer memory which temporarily stores each data packet for read-out at the data rate, e.g. 40 MHz, of the data bus in FIG. 3. The bus interface 33 coupled to video field assembler 29 receives processed data packets from the bus and includes a tristate latch as described above (comprising a register and a tristate buffer) for supplying the packets for each video field to the video signal assembler 29 at the synchronous field rate of the processed video output signal. It will be apparent that for use in the ring bus arrangement in FIG. 5 a single interface could be multiplexed for both for the packet assembler 25 and the video field assembler 29.

Referring again to FIG. 4, and taking the first bus segment 13a as typical, when a header arrives at the bus latch 15 which controls transmission over that bus segment it is transmitted to bus controller $C_1$. It checks whether the header signifies that the data packet to which it relates is empty or full. If full, the controller $C_1$ then checks whether such packet is for a video field to be assigned to the associated processor $P_1$. If so, when such data packet arrives at latch 15 the controller $C_1$ actuates such latch to transmit it to switch $S_1$ and causes processor $P_1$ to actuate switch S1 to store the data in such packet in memory $M_1$. The controller $C_1$ also alters the relevant header to denote such packet as now empty, and the empty packet is transmitted downstream to the next bus latch 17. If the header was for a video field not assigned to processor $P_1$, the controller $C_1$ actuates bus latch 15 to transmit it and the data packet to which it relates down the bus untouched. If a header for an empty data packet arrives and memory $M_1$ has a processed data packet stored therein ready for transmission, information describing such processed data packet is placed in the header by bus controller $C_1$ and processor $P_1$ prepares for transmission of such packet from memory $M_1$ to the data bus in the empty packet when it arrives. The data bus is clocked by input I/O interface 11 so that all data flow thereon is synchronized.

In a specific embodiment of the video display apparatus, the bus 13 is a 64-bit data bus and there are 128 video processors, each having an Intel 80860 microprocessor unit clocked at 40 MHz. The memory of each processor consists of two interleaved banks of static column DRAMs 64 bits wide, each bank providing 8 Mbytes of memory and having a cycle time of 50 ns in static column mode. The input video data supplied to the apparatus is converted by input I/0 interface 11 into 64 bit data words.

It should be noted that since the bus is segmented, each segment being associated with a respective processor and all processors operate concurrently on respective complete video images, that with N segments the effective information processing rate will be $N/2 \times BW$, where BW is the bandwidth of the bus. The bus bandwidth is thereby magnified by a factor of 64 when $N=128$.

While the invention has been described with reference to certain specific embodiments thereof, it will be apparent to those skilled in the art that various modifications and adaptations thereof may be made without departing from the essential teachings and scope of the invention as set forth in the ensuing claims.

What is claimed is:

1. Video display apparatus for determining the effect of a selected signal processing algorithm on a video picture formed by a video data signal representing time sequential video images which constitute said video picture; said apparatus comprising:
   input interface means for receiving said video data signal and assembling data therein relating to the sequential video images into a train of data packets in successive equal time slots, the data packets including headers identifying to which video image each particular data packet relates;
   a data bus having an input for receiving the successive data packets for transmission downstream on said data bus to an output thereof;

a series of a number N (N>1) of bus latches along said data bus for segmenting said data bus into N successive bus segments, transmission from an upstream bus segment to an adjoining downstream bus segment being controlled by an intervening bus latch;

a series of said number N of programmable bus controllers respectively coupled to the respective bus segments, each bus controller being adapted to control the bus latch for the corresponding bus segment and to determine from the headers of data packets received by said bus latch those of said data packets which relate to a particular video image; the bus controllers being programmed so that each successive one thereof controls the associated bus latch to select data packets which relate to a corresponding successive image in each series of said number N of sequential video images;

a series of said number N of data processors respectively coupled to the respective bus segments and to the associated bus controllers, each processor receiving from a bus segment coupled thereto data packets selected by the associated bus controller and being programmed to process the received data packets in accordance with said selected signal processing algorithm, the processed data packets being supplied by said processor back to said bus segment for downstream transmission on said data bus as synchronized by said bus controller;

each processor being adapted to complete processing of the data packets relating to a particular video image during a time period corresponding to said number N of successive video images, so that each succeeding series of N successive video images is cyclically assigned by said series of bus controllers to said series of processors and the data packets relating to each series of N video images are processed in parallel; and output interface means coupled to the output of said data bus to receive the processed data packets relating to successive video images and assemble said processed data packets into a composite output video data signal;

whereby said output video data signal represents time sequential video images corresponding to said video picture as modified by said selected signal processing algorithm.

2. Video display apparatus as claimed in claim 1, further comprising a video display terminal coupled to said output interface means for receiving said output video data, video signal and producing said modified video picture therefrom.

3. Video display apparatus as claimed in claim 1 wherein the selected signal processing algorithm includes processing in the time domain requiring finite impulse response (FIR) filtering, and any nth processor $P_n$ in said series of N processors, where $1<n<N$, comprises a memory having an input section and an output section and is adapted to:

(i) receive in the input section of the memory of said processor $P_n$ data packets supplied from the output section of the memory of the neighboring upstream processor $P_{n-1}$ and which are copies of data packets received by said neighboring upstream processor $P_{n-1}$ from the data bus for processing thereby;

(ii) transfer to the output section of the memory of said processor $P_n$ data packets received from said neighboring upstream processor $P_{n-1}$, together with copies of data packets received by processor $P_n$ from the data bus for processing thereby; and (iii) under the control of the bus controller associated with said processor $P_n$, transfer data packets in the output section of the memory of said processor $P_n$ to the input section of the memory of the neighboring downstream processor $P_{n+1}$;

whereby each of said processors is supplied with data packets which are to be processed thereby and also with data packets which are to be processed by a neighboring upstream processor.

4. Video display apparatus as claimed in claim 1 wherein the selected signal processing algorithm includes processing in the time domain requiring infinite impulse response (IIR) filtering, and any nth processor $P_n$ in said series of N processors where $1<n<N$, comprises a memory having an input section and an output section and is adapted to:

(i) receive in the input section of the memory of said processor $P_n$ data packets supplied from the output section of the memory of the neighboring upstream processor $P_{n-1}$ and which are copies of processed data packets produced by said neighboring upstream processor $P_{n-1}$;

(ii) transfer to the output section of the memory of said processor $P_n$ data packets received from said neighboring upstream processor $P_{n-1}$, together with copies of processed data packets produced by said processor $P_n$; and (iii) under the control of the bus controller associated with said processor $P_n$, transfer data packets in the output section of the memory of said processor $P_n$ to the input section of the memory of the neighboring downstream processor $P_{n+1}$;

whereby each of said processors is supplied with processed data packets produced by a neighboring upstream processor.

5. Video display apparatus as claimed in claim 1, wherein said data bus is in the form of a ring; said input interface means is a data packet assembler; said output interface means is a video field assembler; and said data packet assembler and video field assembler are both comprised in a single interface which includes means for multiplexing both of said assemblers to said data bus.

6. A video display apparatus comprising:

input interface means for receiving a video data signal representing time sequential video images which constitute a video picture and assembling the video data into a succession of data packets for each of the video images; the data packets being in uniform time slots and having headers identifying to which video image each particular data packet relates;

a data bus having an input coupled to said input interface means to receive successive data packets for downstream transmission on said data bus to an output thereof;

a series of a number N (N>1) of bus latches along said data bus, each bus latch being controllable to either a latching state or a transmitting state and defining a segment of said data bus which extends to a next adjoining downstream bus latch, thereby forming a series of said number N of successive bus segments;

a series of said number N of programmable bus controllers respectively coupled to said series of N bus segments, each bus controller controlling the upstream bus latch of the relevant bus segment so as to select, based on the headers of data packets on said bus segment, those of said data packets which relate to a video image which is assigned to said bus segment, each series of N successive video images being serially assigned to said series of N successive bus segments;

a series of said number N of data processors respectively coupled to the series of bus segments, each processor receiving from the related bus segment data packets which relate to a video image assigned to said bus segment and being programmed to process said data packets in accordance with a selected video processing algorithm; the processed data packets produced by a processor being returned by said processor to said bus segment for transmission downstream on said data bus as synchronized by the bus controller for said bus segment;

each data processor being adapted to process data packets relating to a complete video image within a time interval corresponding to N successive video images; and output interface means for receiving the processed data packets and assembling them into an output video data signal representing said video picture as modified in accordance with said selected video processing algorithm.

* * * * *